United States Patent
Paul

(10) Patent No.: US 8,245,974 B2
(45) Date of Patent: Aug. 21, 2012

(54) DRAINAGE DEVICE, AIRCRAFT, AND METHOD FOR LETTING OUT A FLUID THAT IS PRESENT BETWEEN THE EXTERIOR SKIN AND THE INTERIOR LINING OF AN AIRCRAFT

(75) Inventor: Carsten Paul, Garstedt (DE)

(73) Assignee: Airbus Operations GmbH, Hamburg (DE)

( * ) Notice: Subject to any disclaimer, the term of this patent is extended or adjusted under 35 U.S.C. 154(b) by 979 days.

(21) Appl. No.: 12/225,338

(22) PCT Filed: Mar. 14, 2007

(86) PCT No.: PCT/EP2007/002258
§ 371 (c)(1),
(2), (4) Date: Sep. 18, 2008

(87) PCT Pub. No.: WO2007/107281
PCT Pub. Date: Sep. 27, 2007

(65) Prior Publication Data
US 2010/0044512 A1    Feb. 25, 2010

Related U.S. Application Data

(60) Provisional application No. 60/784,197, filed on Mar. 21, 2006.

(30) Foreign Application Priority Data

Mar. 21, 2006 (DE) .......................... 10 2006 012 953

(51) Int. Cl.
*B64C 1/06* (2006.01)
*B64C 1/00* (2006.01)
(52) U.S. Cl. .................................... 244/129.1; 244/119
(58) Field of Classification Search ................. 244/119, 244/125, 129.1; 52/302.3
See application file for complete search history.

(56) References Cited

U.S. PATENT DOCUMENTS

| | | | |
|---|---|---|---|
| 3,740,905 A | | 6/1973 | Adams |
| 3,867,244 A | | 2/1975 | Adams |
| 4,291,851 A | | 9/1981 | Johnson |
| 4,715,561 A | * | 12/1987 | Spinosa et al. ............. 244/129.1 |
| 5,398,889 A | * | 3/1995 | White et al. .................. 244/119 |
| 5,577,688 A | | 11/1996 | Sloan |
| 5,779,193 A | | 7/1998 | Sloan |
| 6,308,470 B1 | * | 10/2001 | Durkovic ..................... 52/169.5 |

FOREIGN PATENT DOCUMENTS

| | | |
|---|---|---|
| FR | 2 547 608 A1 | 12/1984 |
| RU | 2297948 C2 | 4/2007 |
| SU | 1694808 A1 | 11/1991 |

* cited by examiner

*Primary Examiner* — Rob Swiatek
(74) *Attorney, Agent, or Firm* — Lerner, David, Littenberg, Krumholz & Mentlik, LLP

(57) ABSTRACT

A drainage device for letting out a fluid that is present between the exterior skin and the interior lining of an aircraft, wherein the drainage device comprises a collecting vessel and an outlet line. The collecting vessel is designed to collect the fluid that is present between the exterior skin and the interior lining and the outlet line is connected to the collecting vessel and is designed to let out the collected fluid.

15 Claims, 4 Drawing Sheets

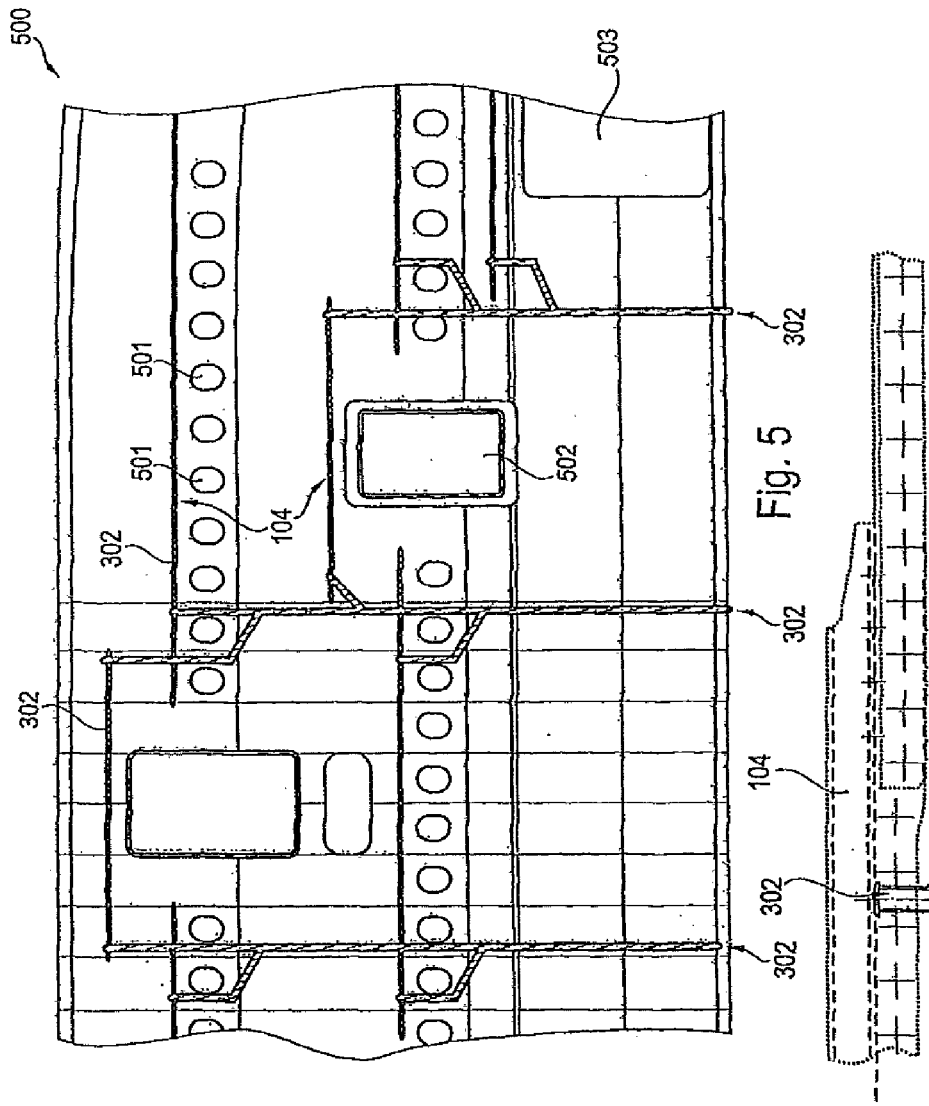

DRAINAGE DEVICE, AIRCRAFT, AND METHOD FOR LETTING OUT A FLUID THAT IS PRESENT BETWEEN THE EXTERIOR SKIN AND THE INTERIOR LINING OF AN AIRCRAFT

REFERENCE TO RELATED APPLICATIONS

This application claims the benefit of the filing date of German Patent Application No. 10 2006 012 953.9 filed Mar. 21, 2006 and of U.S. Provisional Patent Application No. 60/784,197 filed Mar. 21, 2006, the disclosure of which applications is hereby incorporated herein by reference.

TECHNICAL FIELD

The invention relates to a drainage device, an aircraft, and a method for letting out a fluid that is present between the exterior skin and the interior lining of an aircraft.

BACKGROUND TO THE INVENTION

Conventionally, in aircraft it can occur that condensation- or perspiration water flows from the interior lining into the passenger cabin. Furthermore, undesirable saturation/absorption of an insulation material of the interior lining can occur as a result of condensation- or perspiration water. It should be noted that within the context of the present invention the term "interior lining" refers to both the interior lining itself, as well as to an insulation material that extends at a distance from the exterior skin, since for example in cargo aircraft it is not mandatory to provide the interior of the fuselage tube with a lining in the actual sense.

SUMMARY OF THE INVENTION

There may be a need to prevent any problems associated with condensation- or perspiration water emanating from the interior lining of an aircraft.

This need may be met by drainage device, by an aircraft and by a method for letting out a fluid that is present between the exterior skin and the interior lining of an aircraft, with the characteristics according to the independent claims.

According to an exemplary embodiment of the invention a drainage device for letting out a fluid that is present between the exterior skin and the interior lining of an aircraft is provided, wherein the drainage device comprises a collecting vessel and an outlet line, wherein the collecting vessel is designed to collect the fluid between the exterior skin and the interior lining, and wherein the outlet line is connected to the collecting vessel and is designed to let out the collected fluid.

According to another exemplary embodiment of the invention, an aircraft is provided, comprising an exterior skin, an interior lining, and a drainage device with the characteristics mentioned above for letting out a fluid that is present between the exterior skin and the interior lining.

According to yet another exemplary embodiment of the invention, a method for letting out a fluid that is present between the exterior skin and the interior lining of an aircraft is provided, wherein the method involves collecting the fluid by means of a collecting vessel between the exterior skin and the interior lining, and letting out the collected fluid by means of an outlet line that is connected to the collecting vessel.

According to an exemplary embodiment of the invention, a drainage device for an aircraft is created, by means of which drainage device condensation- or perspiration water, which can arise between the exterior skin of an aircraft and the interior lining of the aircraft, can be collected in a collecting vessel and can be let out by way of an outlet line (for example into the fuselage of the aircraft). In this way a situation can be prevented in which in an undesirable manner perspiration- or condensation water from the space between the exterior skin and the interior lining of the aircraft reaches the passenger cabin, or in which insulation material of the interior lining is saturated with such a fluid (for example a liquid).

Concretely, according to the invention, drainage of condensation- or perspiration water on the exterior skin can be provided on the inside in the aircraft. In this way condensation water can be led away without the insulation becoming saturated and without water collecting in corners. Any outflow of water from the interior lining to the passenger region can effectively be prevented in this way.

In particular, according to the invention, condensation- and perspiration water on the exterior skin can be drained off in the interior of the aircraft. According to an exemplary embodiment, a stringer in an aircraft can be placed (e.g. turned around when compared to the conventional orientation) such that the head of said stringer points upwards, thus serving as a kind of gutter. The collected water can then be led away downwards by way of an (optional) drainage funnel and a hose.

The use of such a gutter can, for example, take place above the window (for example on the second stringer above the windows), above the door openings of the aircraft doors, as well as above the freight door opening.

In such an exemplary embodiment the water can be led downwards into the fuselage by way of a hose system with branch lines. Due to the universal configuration of such a drainage system the latter can be used in all aircraft types.

Exemplary embodiments of the invention are associated with an advantage in that no water arises in the window region, and consequently no egress of water from the window lining can occur. Furthermore, no water can egress from the longitudinal beams above the doors. Furthermore, any uncontrolled accumulation of water that can collect on the cargo space lining above the freight doors that are sealed so as to be gas-proof is reliably prevented. The insulation can thus no longer absorb water to such an extent as in the case in conventional aircraft. The drainage according to the invention can be implemented wherever drainage is required.

The drainage according to the invention can, for example, be used in any type of aircraft, in particular in passenger aircraft or military aircraft, in airships, in dirigibles or in space ships.

The drainage according to the invention can increase the service life of aircraft components because damage caused by moisture can be avoided. Furthermore, mechanical weakness of such components as a result of moisture saturation or corrosion can be prevented.

Below, further advantageous embodiments of the invention are described. First, exemplary embodiments of the drainage device are described. However, these also apply to the aircraft according to the invention and to the method according to the invention for letting out a fluid that is present between the exterior skin and the interior lining of an aircraft.

The collecting vessel can be attached or attachable between the exterior skin and the interior lining. For example, the collecting vessel can be provided as a stringer in one piece with the exterior skin, and can be attached to the interior lining, with the use of a suitable attachment element, or glued to said lining.

The collecting vessel can comprise an essentially S-shaped cross section. The upper and the lower delimiting surface of the S can then be connected to the exterior skin or to the interior lining so that such a collecting vessel can be realised without great additional expenditure.

The collecting vessel can be a stringer that is attached or attachable between the exterior skin and the interior lining. In this way the stringer can also be used as a collecting vessel and apart from its structural and supporting characteristics can additionally be used as a type of gutter.

The drainage device can comprise an attachment-element by means of which the stringer can be attached to the interior lining, in particular to an insulating mat of the interior lining. Such an attachment element can, for example, be a clip or a magnetic attachment element.

The collecting vessel can be formed by a stringer and the exterior skin, or by a stringer and the interior lining. In this way an essentially one dimensionally extending gutter can be formed without the need for any additional elements.

The outlet line can comprise a hose (or a tube) or a multitude of hoses (or of tubes). With the use of a hose it is possible, with little expenditure and great flexibility, to lead the accumulated fluid to a predefined location, for example to the fuselage of an aircraft.

The hose can comprise at least one branch line. In this way a hose system between the interior lining and the exterior skin of the aircraft can be implemented, which at moisture-critical positions collects fluid and conveys this fluid, for example from stringer elements, by way of the branched hose system to a predefined location, such as the fuselage of an aircraft.

Furthermore, the drainage device can comprise a drainage funnel that is arranged between the collecting vessel and the outlet line. By means of a drainage funnel the liquid that has accumulated in the collecting vessel can be focused and led into the hose.

Below, exemplary embodiments of the aircraft are described. These also apply to the drainage device and to the method according to the invention.

The drainage device can be arranged above an aircraft window. In this way undesirable moistening of the aircraft window as a result of accumulated perspiration- or condensation water can be prevented.

As an alternative or in a complementary manner the drainage device can be arranged above an aircraft door. Aircraft doors are safety-relevant regions and are to be protected from any undesirable moisture build-up, which can be made possible according to the invention.

The drainage device can be designed for letting out the collected fluid into the fuselage of the aircraft. In this manner the fluid can be transported to a desired location. It is also possible, if need be after optional cleaning such as for example filtering, to convey the fluid that has accumulated in that location to the fluid-supply system of the aircraft, for example for an aircraft toilet, for humidifying the passenger compartment, for cooling, etc.

It should be noted again that within the context of the present invention the term "interior lining" refers to both the interior lining itself and to an insulation material that extends at a distance from the exterior skin.

Exemplary embodiments of the invention are shown in the figures and are explained in more detail below.

BRIEF DESCRIPTION OF THE DRAWINGS

The following are shown:
FIGS. 5 and 6 different operating states of a drainage device according to an exemplary embodiment of the invention.

DETAILED DESCRIPTION OF PREFERRED EMBODIMENTS

Figure 1:
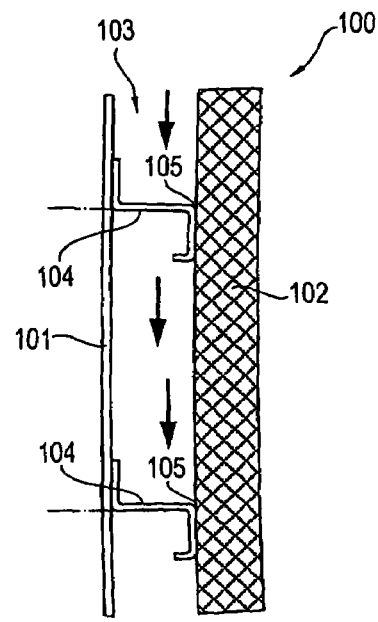
FIG. 1 a drainage device according to an exemplary embodiment of the invention.

Identical or similar components in different figures have the same reference characters. The illustrations in the figures are diagrammatic and not to scale.

Below, with reference to FIG. 1 a drainage device 100 according to an exemplary embodiment of the invention is described.

The drainage device 100 is provided for letting out condensation water 103 present between the exterior skin 101 and the interior lining 102 of an aircraft.

The drainage device 100 comprises a stringer element 104 as a collecting vessel and an outlet line (not shown in FIG. 1), which by means of the stringer 104 collects accumulated condensation water and lets it out in a manner similar to that of a gutter.

As shown in FIG. 1 the collecting vessel 104 is formed as a stringer element whose cross section is S-shaped and is attached between the exterior skin 101 and the interior lining 102. More precisely expressed, the stringer element 104 is formed in one piece with the exterior skin 101. Attachment of the stringer element 104 with the interior lining 102 can, for example, take place by means of an adequately impervious adhesive connection 105.

The stringer element 104, the exterior skin 101 and the interior ling 102 form a cavity in which the condensation water 103 can be collected.

Figure 2:
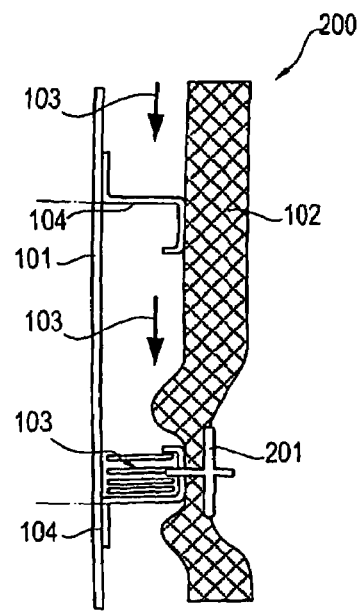
FIG. 2 a drainage device according to an exemplary embodiment of the invention.

FIG. 2 shows a drainage device 200 according to another exemplary embodiment of the invention.

The drainage device 200 essentially differs from the drainage device 100 in that the (lower) stringer 104 has been turned the other way round so as to form a cavity even without being attached to the interior lining 102, in which cavity fluid 103 collects. In the configuration according to FIG. 2 the stringer head is turned the other way round when compared to the conventional configuration so that said stringer head points upwards, thus serving as a gutter. Furthermore, FIG. 2 provides for an (optional) attachment pin with clip 201 for attaching the stringer 104 to the insulation 102.

Figure 3:
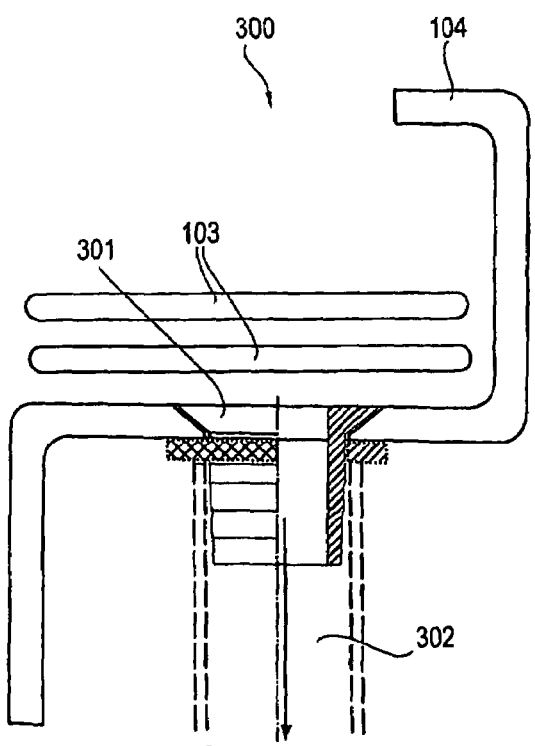
FIGS. 3 and 4 different views of a drainage device according to an exemplary embodiment of the invention.

FIG. 3 shows a drainage device 300 according to an exemplary embodiment in an enlarged form.

As shown in FIG. 3 the drainage device comprises a hose 302 as an outlet line. Furthermore, between the hose 302 and the stinger element 104, which comprises a drill hole, a drainage funnel 301 is provided in which the water 103 that accumulates above it can be collected and fed into the hose 302.

Figure 4:
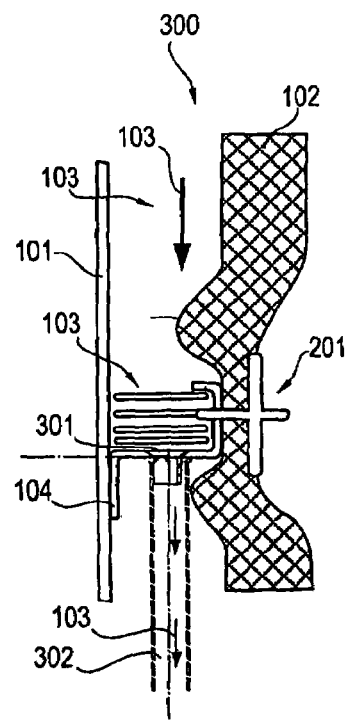

FIG. 4 again shows an enlarged view of the drainage device 300 of FIG. 3.

The collected water 103 is led away downwards by way of the drainage funnel 301 and the hose 302.

FIG. 5 shows a drainage arrangement 500 or parts thereof, in which drainage arrangement, 500 the hose 302 is a hose system with branch lines.

Parts of this hose system 302 are arranged above the windows 501 in order to prevent any wet areas in these regions. At position 104, stringers that have been turned around can be provided as a gutter.

Furthermore, the hose system 302 can be provided such that fluid above a door 502 is let out. Such letting out of water can also take place above a freight door 503.

FIG. 6 again shows the drainage hose 302 as well as the gutter 104.

Figure 7:
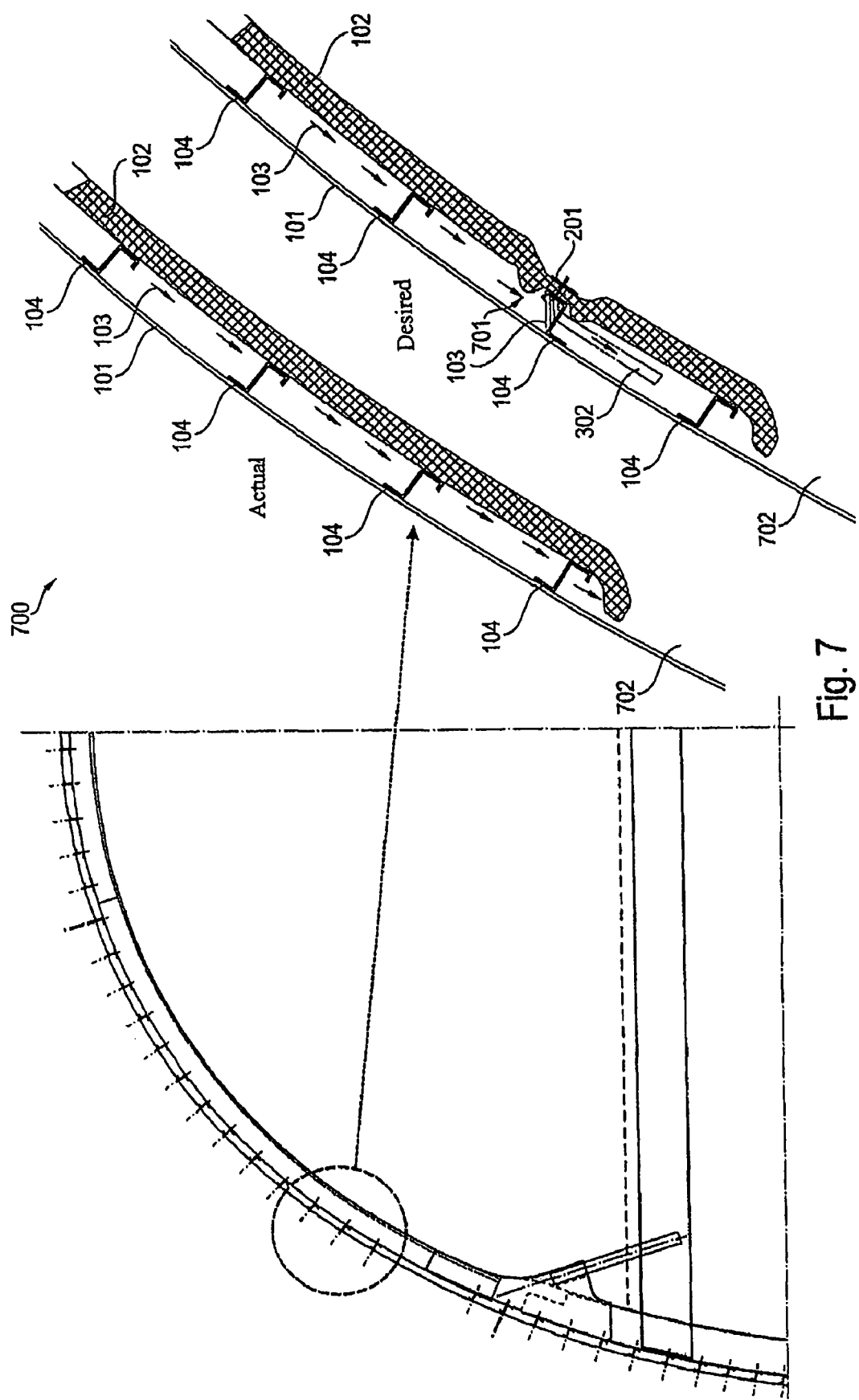
FIG. 7 a drainage device according to an exemplary embodiment of the invention.

FIG. 7 shows a drainage arrangement 700, in which, in particular, drainage holes 701 and a window region 702 are shown.

The stringers 104, which have been turned the other way round, can thus be used above the UD doors and the windows.

Figure 8:
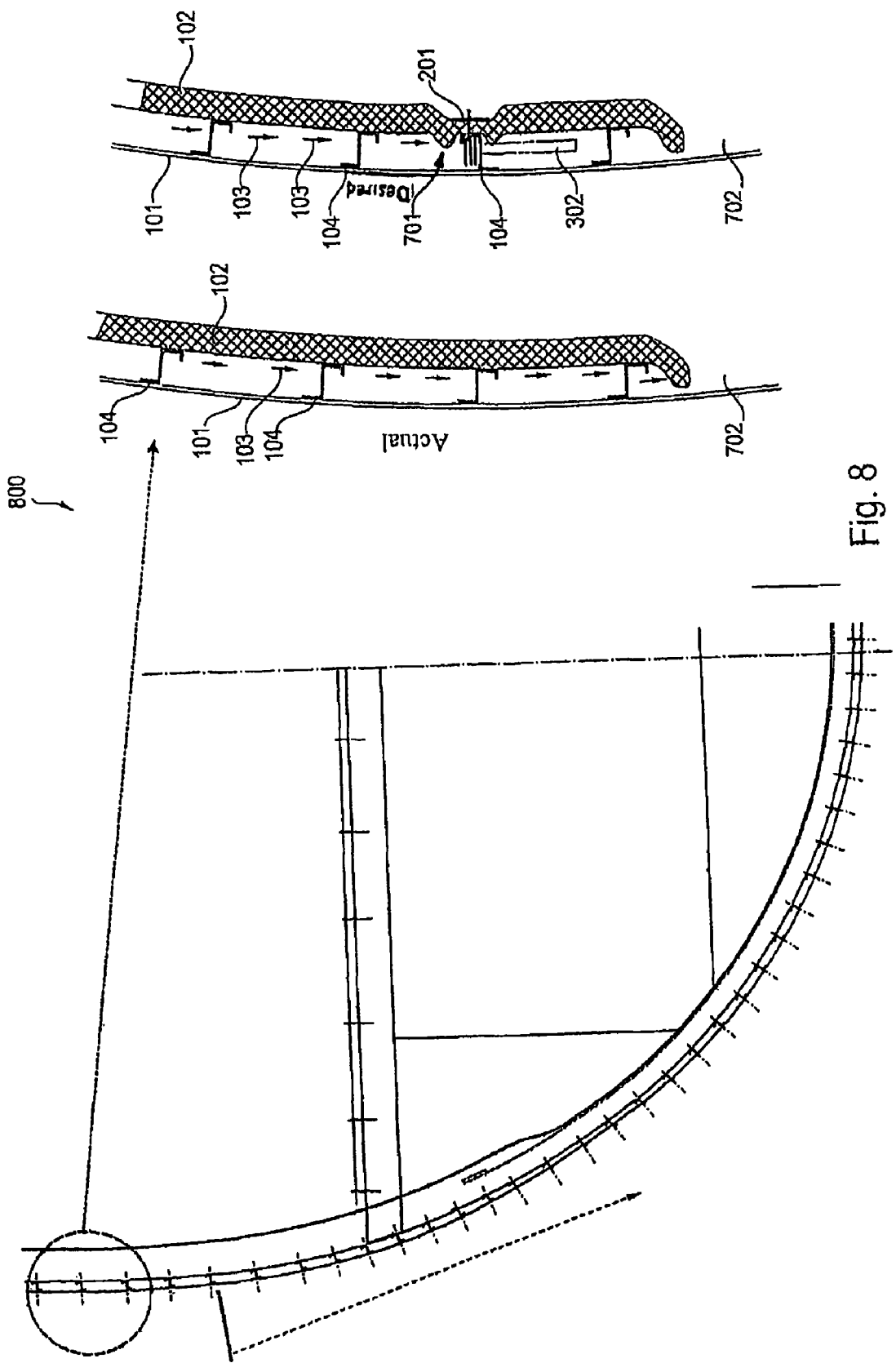
FIG. 8 a drainage device according to an exemplary embodiment of the invention.

FIG. 8 shows a drainage device 800 in which the stringers 104, which have been turned the other way round, can be used above the MD doors, windows or freight doors.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A drainage device for letting out a fluid that is present between the exterior skin and the interior lining of an aircraft, wherein the drainage device comprises:
   a collecting vessel;
   an outlet line;
   wherein the collecting vessel is configured to collect the fluid between the exterior skin and the interior lining;
   wherein the outlet line is connected to the collecting vessel and is configured to let out the collected fluid; and
   wherein the collecting vessel comprises a stringer.

2. The drainage device of claim 1,
   wherein the collecting vessel is attachable between the exterior skin and the interior lining.

3. The drainage device of claim 2,
   wherein the collecting vessel comprises a substantially S-shaped cross section.

4. The drainage device of claim 1,
   wherein the collecting vessel is attachable to the exterior skin.

5. The drainage device of claim 1,
   wherein the stringer is attached to the exterior skin at such orientation that said stringer forms a cavity with the exterior skin.

6. The drainage device of claim 1,
   further comprising an attachment element, by which the stringer is attached to an insulating mat of the interior lining.

7. The drainage device of claim 1,
   wherein the collecting vessel is formed by a stringer and at least one of the exterior skin and the interior lining.

8. The drainage device of claim 1,
   wherein the outlet line comprises a hose.

9. The drainage device of claim 8,
   wherein the hose comprises at least one branch line.

10. The drainage device of claim 1,
    further comprising a drainage funnel that is arranged between the collecting vessel and the outlet line.

11. An aircraft comprising
    an exterior skin;
    an interior lining;
    a drainage device for letting out a fluid that is present between the exterior skin and the interior lining, wherein the drainage device comprises:
    a collecting vessel;
    an outlet line;
    wherein the collecting vessel is designed to collect the fluid between the exterior skin and the interior lining;
    wherein the outlet line is connected to the collecting vessel and is designed to let out the collected fluid; and
    wherein the collecting vessel comprises a stringer.

12. The aircraft of claim 11,
    wherein the drainage device is arranged above an aircraft window.

13. The aircraft of claim 11,
    wherein the drainage device is arranged above an aircraft door.

14. The aircraft of claim 11,
    wherein the drainage device is configured to let out the collected fluid into a fuselage of the aircraft.

15. A method for letting out a fluid that is present between the exterior skin and the interior lining of an aircraft, comprising:
    collecting the fluid by a collecting vessel between the exterior skin and the interior lining; and
    letting out the collected fluid by an outlet line connected to the collecting vessel;
    wherein the collecting vessel comprises a stringer.

* * * * *